US012613872B1

(12) United States Patent
Bishoyi et al.

(10) Patent No.: US 12,613,872 B1
(45) Date of Patent: Apr. 28, 2026

(54) SMART HELP PLATFORM

(71) Applicant: Elevance Health, Inc., Indianapolis, IN (US)

(72) Inventors: Binod Bishoyi, Mason, OH (US); Mohamed Musthaba Abubakkar, Mason, OH (US); Sai Prasad Durga Gudla, Mason, OH (US); Kandappan Ramalingam, Tamil Nadu (IN)

(73) Assignee: Elevance Health, Inc., Indianapolis, IN (US)

( * ) Notice: Subject to any disclaimer, the term of this patent is extended or adjusted under 35 U.S.C. 154(b) by 0 days.

(21) Appl. No.: 18/800,648

(22) Filed: Aug. 12, 2024

Related U.S. Application Data

(63) Continuation of application No. 17/845,654, filed on Jun. 21, 2022, now Pat. No. 12,061,610.

(60) Provisional application No. 63/213,205, filed on Jun. 21, 2021, provisional application No. 63/213,202, filed on Jun. 21, 2021.

(51) Int. Cl.
| | |
|---|---|
| *G06F 16/2457* | (2019.01) |
| *G06F 16/215* | (2019.01) |
| *G06F 16/23* | (2019.01) |

(52) U.S. Cl.
CPC ........ G06F 16/2457 (2019.01); G06F 16/215 (2019.01); G06F 16/2358 (2019.01)

(58) Field of Classification Search
None
See application file for complete search history.

(56) References Cited

U.S. PATENT DOCUMENTS

| | | | | |
|---|---|---|---|---|
| 9,449,300 | B2 * | 9/2016 | Kalscheuer | ............ G06Q 10/10 |
| 11,360,937 | B2 * | 6/2022 | Shukes | ................ G06F 16/156 |
| 11,429,687 | B2 * | 8/2022 | Rudden | .............. G06F 16/9035 |
| 11,663,179 | B2 * | 5/2023 | Li | ....................... G06F 16/2455 |
| | | | | 707/687 |
| 11,960,618 | B2 * | 4/2024 | Hasegawa | ......... G06F 16/24573 |

(Continued)

OTHER PUBLICATIONS

Protecting Confidentiality with Encrypted Query Processing (Year: 2011).*

(Continued)

*Primary Examiner* — Kim T Nguyen
(74) *Attorney, Agent, or Firm* — Morgan, Lewis & Bockius LLP

(57) ABSTRACT

A system receives a search query for a user's information. The system obtains, from a database, user information including a confidentiality status. The system generates a search result interface that visually distinguishes the user's information based on the confidentiality status. The system also displays the interface, including an indication that confidential communication is invoked for the user's contract. The system also stores a confidential communication password and an alternate address associated with the contract. The system also receives a request from an agent to access the confidential information. The system also initiates a privacy validation process by prompting the agent to perform a verbal privacy validation and verify completion of validation steps. Upon successful completion of the validation, the system provides the agent with secure access to the confidential communication password, and logs the password access event in an audit trail. The system utilizes natural language processing for interactions.

20 Claims, 2 Drawing Sheets

(56)　　　　　References Cited

U.S. PATENT DOCUMENTS

| | | | |
|---|---|---|---|
| 12,061,610 B1 * | 8/2024 | Bishoyi | G06F 16/2358 |
| 12,346,713 B1 * | 7/2025 | Vlasceanu | G06F 16/3346 |
| 2013/0085815 A1 * | 4/2013 | Onischuk | G07C 13/00 |
| | | | 235/386 |
| 2014/0025443 A1 * | 1/2014 | Onischuk | G07C 13/00 |
| | | | 705/12 |
| 2014/0231512 A1 * | 8/2014 | Onischuk | G07C 13/00 |
| | | | 235/386 |
| 2019/0303577 A1 * | 10/2019 | Skvortsov | G06N 5/048 |
| 2020/0218826 A1 * | 7/2020 | Nohara | G09C 1/00 |
| 2021/0109986 A1 * | 4/2021 | Rudden | G06F 16/953 |
| 2022/0253871 A1 * | 8/2022 | Miller | G06F 16/36 |
| 2023/0065222 A1 * | 3/2023 | Hasegawa | G06F 21/604 |
| 2023/0153310 A1 * | 5/2023 | Yun | G06F 16/24578 |
| | | | 707/727 |
| 2023/0334031 A1 * | 10/2023 | Acker | G06F 16/219 |
| 2023/0401274 A1 * | 12/2023 | Denninghoff | G06Q 30/0251 |
| 2025/0147969 A1 * | 5/2025 | Chen | G06F 16/2457 |
| 2025/0307277 A1 * | 10/2025 | Bandugula | G16H 15/00 |
| 2025/0328536 A1 * | 10/2025 | Gadit | G06F 16/24578 |
| 2025/0348475 A1 * | 11/2025 | Eberlein | G06F 16/2358 |
| 2025/0371312 A1 * | 12/2025 | Cantu | G06F 16/2457 |

OTHER PUBLICATIONS

CryptDB: Protecting Confidentiality with Encrypted Query Processing (Year: 2011).*

* cited by examiner

SMART HELP PLATFORM

RELATED APPLICATIONS

This application is a continuation of U.S. application Ser. No. 17/845,654, filed Jun. 21, 2022, titled "Smart help Platform," which claims priority to U.S. Provisional Application No. 63/213,202, filed Jun. 21, 2021, and U.S. Provisional Application No. 63/213,205, filed Jun. 21, 2021, each of which is hereby incorporated by reference in its entirety.

SUMMARY

This application describes an intuitive, easy to use, RPA based tool to assist technical helpdesk agents, support teams resolve members' issues quickly. The implementations described herein provide insights to leaders and account executives with digital trends and real-time access into the member's digital footprint. The implementations described herein resolve data anomalies using a built-in diagnostic tool.

BRIEF DESCRIPTION OF THE DRAWINGS

So that the present disclosure can be understood in greater detail, features of various embodiments are illustrated in the appended drawings. The appended drawings, however, merely illustrate pertinent features of the present disclosure and are therefore not limiting.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, some processes, components, and materials have not been described in exhaustive detail so as not to unnecessarily obscure pertinent aspects of the embodiments described herein.

Figure 1:
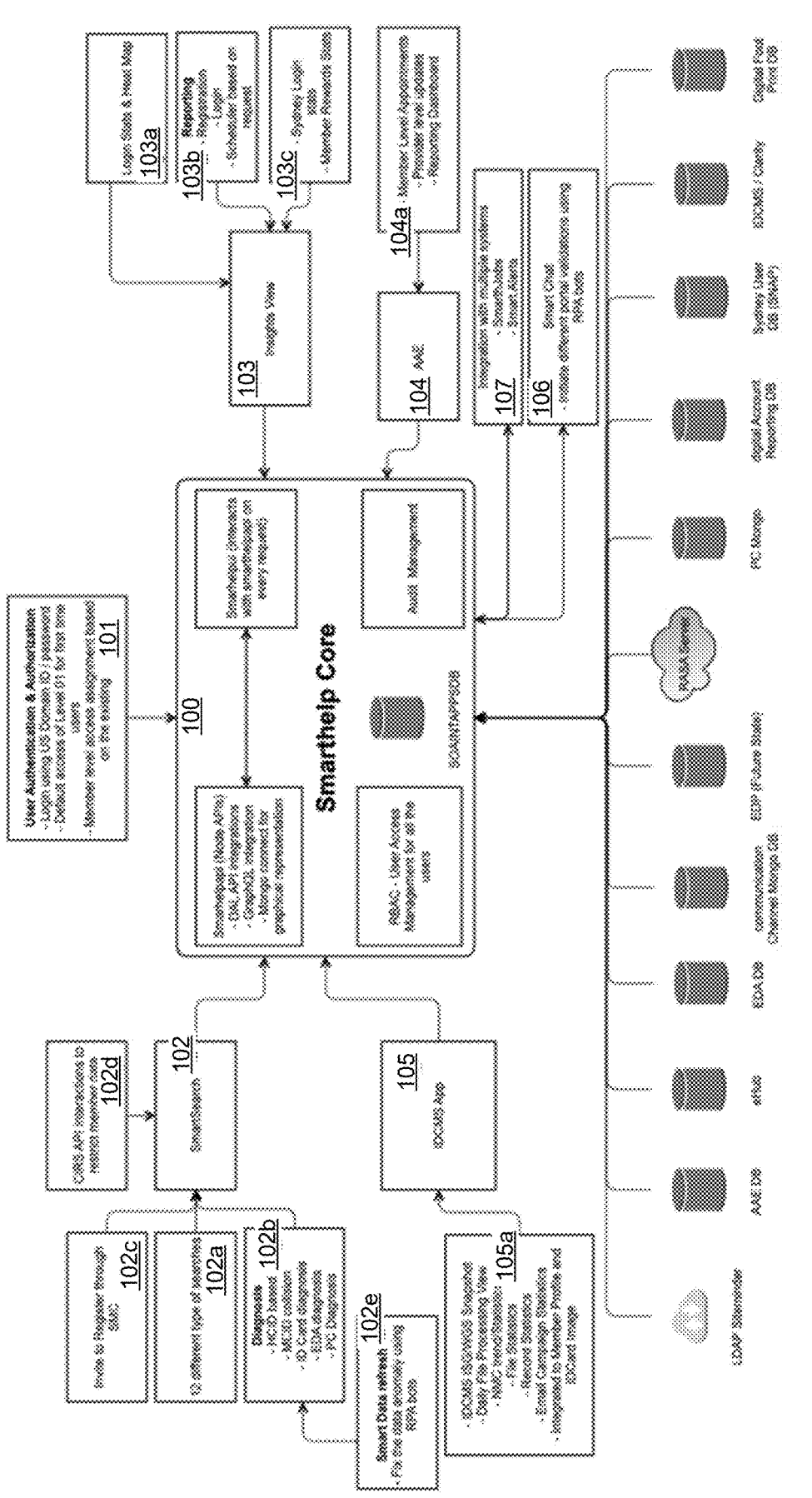
FIG. 1 is a system diagram of a service provider system in accordance with some implementations.

FIG. 1 depicts an example service provider system 100 in accordance with some implementations. Service provider system 100 is a platform for service providers (e.g., customer service representatives), configured to leverage data democracy, cognitive insights, and innovative AI/ML enabling best-in-class constituent experience. System 100 solves unique needs from personas while using modularized shared components and best in class technologies like AI/ML Models and RPA framework. While providing persona specific insights to data, system 100 has capabilities to resolve anomalies using inbuilt diagnostic tools over Robotic Process Automation (RPA) Architecture. Additionally system 100 has capabilities to perform portal health check and validation using natural language processing and inbuilt Rasa frame work, AI/ML Model, and RPA bots.

System 100 may be implemented via a server system including one or more processors and memory storing one or more programs to be executed by the one or more processors, the one or more programs including instructions for executing one or more of the operations described herein. Service providers (e.g., customer service representatives)

may access system 100 using a computing device, typically an electronic device including one or more of a desktop or laptop computer, a smart phone or any other type of electronic mobile device, smart speaker, or any other type of electronic computing device not yet developed as of the filing date of this document.

The server system implementing system 100 may optionally communicate with computing devices via wired and/or wireless communication connections. Communication networks optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VOIP), Wi-MAX, and/or any other suitable communication protocol, including communication protocols not yet developed as of the filing date of this document.

The computing devices of system 100 may include one or more processing units (CPUs), one or more network interfaces, memory, and one or more communication buses for interconnecting these components (sometimes called a chipset). In some embodiments, the computing devices include one or more input devices that facilitate user input, such as a keyboard, a mouse, a voice-command input unit or microphone, a touch screen display, a touch-sensitive input pad, a gesture capturing camera, or other input buttons or controls. In some embodiments, the computing devices includes one or more output devices that enable presentation of user interfaces and display content, including one or more speakers and/or one or more visual displays.

The memory may include high-speed random access memory, such as DRAM, SRAM, DDR RAM, or other random access solid state memory devices, and optionally may include non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. The memory, or alternatively the non-volatile memory within memory, may include a non-transitory computer readable storage medium. In some implementations, the memory, or the non-transitory computer readable storage medium of the memory, stores the following programs, modules, and data structures, or a subset or superset thereof:

Module 101: Associates can login using their network credentials. Role based access implemented within system 100 make sure logged in users have intended experiences within system 100. All transactions performed within system 100 may be audited.

Module 102: Provides a comprehensive view of member's data to assist customer advocacy teams during member interaction.

Module 102*a*: Search feature offers an ability to locate an Anthem member using 12 different combination of inputs including Member Id, FirstName/LastName/DOB, user name, eMail address, activation code, and so forth.

Module 102*b*: Diagnose and Fix feature enables customer advocacy team and production support team to compare the data between source of truth and sources of references and initiate a data refresh when anomalies (mismatches) are detected.

Module 102*c*: Invite to Register feature identifies members in the family who are eligible to register, but not registered yet, and acts as a gateway to invite them via email on file prompting them to register (e.g., on web or mobile). If members follow the link, they just need to enter a first subset of identification information (e.g., first name, last name, and date of birth) to identify themselves because the eligibility check and healthcare identifier (HCID) parameters would have already been baked in the personalized deep link sent via email.

Module 102*d*: When members invoke confidential communication on their contract, HIPAA privacy rules are enforced. Search clearly indicates those parameters along with Conf Comm password and alternate address. Agents perform verbal HIPAA validation on callers and can expose the password for them to be able to login to portal.

Module 102*e*: Data refresh queues up failed diagnosis and refreshes the member in sources of references on daily basis using RPA bots. It also validates the reported issue automatically and compares the current experience vs what was recorded during diagnosis.

Module 103: Insights view offers data transparency and deep insights into digital parameters including Registration trend, Login statistics, and several self service capabilities.

Module 103*a*. Login stats and Heat map shows the login trend on a timescale over a period of time. Users can visualize the number of users logging into anthem via web or mobile for a given date range. We also capture user's IP address while the member logs in. Using this, insights view overlays the concentration of logins in the form of bubbles on top of US map.

Module 103*b*. Marketing Team, leadership and account executives/Sales team can view registration and login trend at a group level and generate registration and login reports in self service mode.

Module 103*c*. Activity based member engage rewards are displayed at group and member level either in dollar or points format as applicable.

Module 104: Online Scheduling: Offers concierge services for members (support unfulfilled appointments with providers and member) resulting in better member engagement.

Module 104*a*: Anthem Appointment Engine offers both member level and provider level views for displaying appointments that are scheduled online.

Module 105: IDCard Management system app brings visibility on data movements around the member id cards between anthem and print vendor.

Module 105*a*: IDCMS app shows the status and progress on files that are processed daily, member level view, No More Cards trend and stats, email campaign stats and control, member's id card images and related features.

Module 106: Chat feature is a conversational chat bot application. Logged in Users can ask for portal validations in chat and the bots behind the Chat feature initiates validation activities, takes screenshots of the Portal UI components, and triggers an email with details to the requestor in just few minutes. Production support team and even leadership team can get the portal health check and validation status by just typing in one single message in the Chat feature.

Module 107: Production support team constantly monitors thousands of alerts from various servers and platforms, along with control-M jobs that kick starts ETL process to move data from source of truth from sources of references. These capabilities are available as jobs and alerts from within system 100.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, the memory, optionally, stores a subset of the modules and data structures identified above. Furthermore, the memory, optionally, stores additional modules and data structures not described above.

Module 102*b* implements diagnose and fix features in accordance with some implementations. This disclosure uses the term diagnose to describe the process of identifying an issue a user or member is having with a service provider system. For example, a user may be having technical issues accessing services provided by a service provider system (e.g., not being able to login), and as a result, the user may contact a customer service representative who uses system 100 to diagnose the user's issues (e.g., determine why the user is not able to login).

More specifically, module 102*b* enables customer advocacy team representatives and/or production support team representatives to compare the data between sources of truth (e.g., data provided by first party sources) and sources of reference (e.g., data provided by a third party) and initiate data refresh operations when mismatches are detected.

Mismatches may include, for example, discrepancies between source of truth data and source of reference data (e.g., missing middle name, different birth year). For example, such data may have been corrected on the backend (at a first party database), but the correction may not have reached third party databases. As a result, the various first party and third party systems become out of sync, causing technical difficulties for users trying to use digital services that require such data to be in sync.

For example, a member may enter identification data (e.g., a date of birth or a middle name that is missing from third party servers), and the service provider system may not allow the member to register for a service due to the mismatch in data.

Module 102*b* updates the third party sources of reference so that the technical issues experienced by the member can be resolved. Module 102*b* checks verifies that the identification data obtained from the source of trust and the source of reference correspond to the same person by comparing other identification data shared between the two sources. For example, module 102*b* may compare key parameters (e.g., the HCID) to ensure that they match.

In some implementations, the HCID represents contract-level information (e.g., associated with a family or an employer), and a sequence number represents a specific member associated with the HCID (e.g., a member within the contract such as an employee or a family member).

In one example, if a first dependent moves out of a health insurance contract, the sequence number for that dependent may be assigned to a second dependent. The source of truth (e.g., a first part server associated with the health insurance system) may be updated with the new sequence number for the second dependent. However, the source of reference (e.g., a third party server associated with a vender of the health insurance system) may not be updated with the new sequence number.

Module 102*b* addresses these mismatch-related issues by first checking to see if other identification data from the two sources match (e.g., first/last name, date of birth, HCID, and so forth), then the sequence number for the second dependent at the source of reference is requested to be updated based on the sequence number for the second dependent at the source of truth.

In some implementations, updating the source of reference includes initiating an agent bot to execute code that submits requests to the third party source of reference to match the identification data with that of the first part source of truth.

Figure 2:
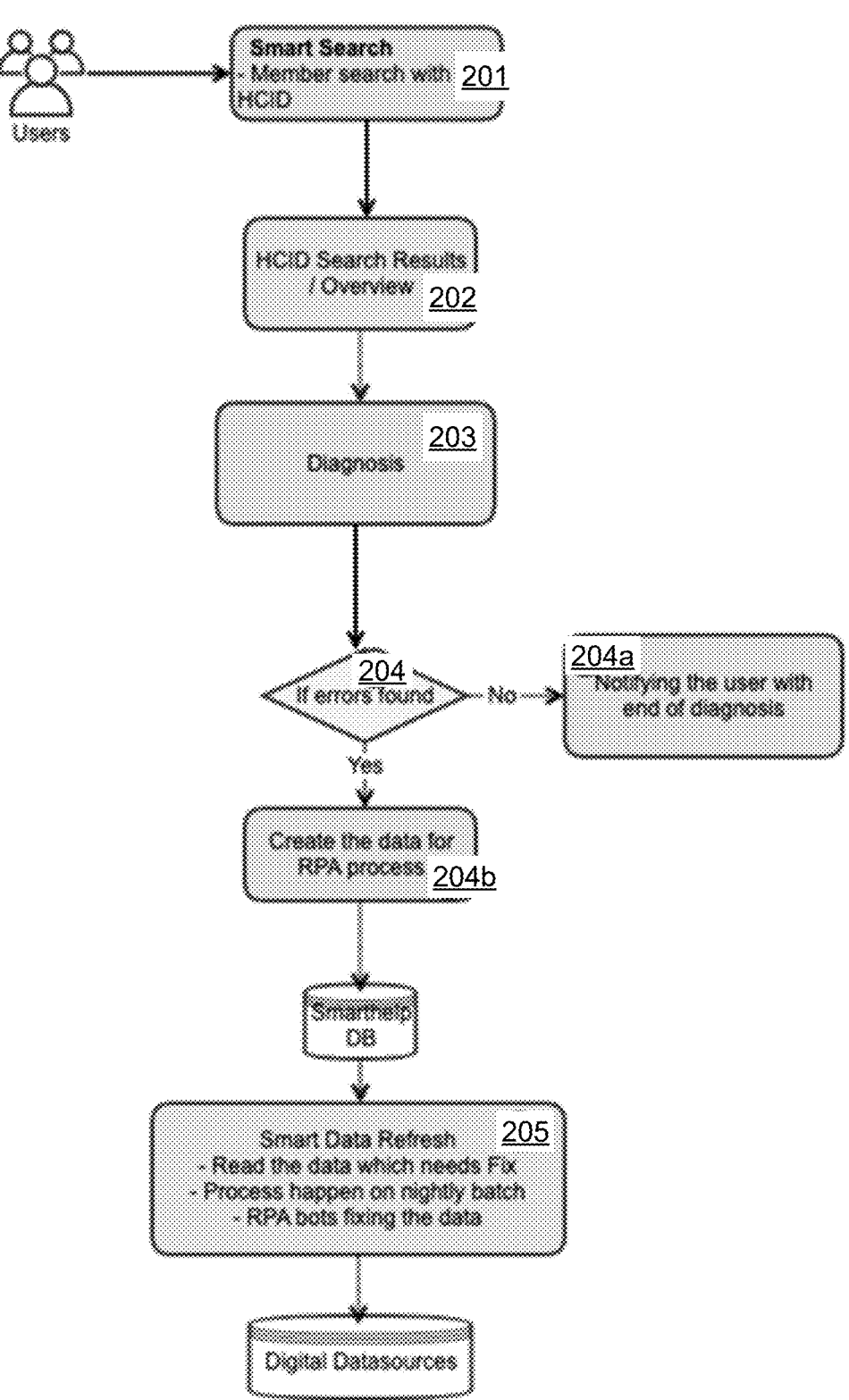
FIG. 2 is a flow diagram of a service provide process in accordance with some implementations.

FIG. 2 is a flow diagram of an example method for implementing the operations of module 102*b*. FIG. 2 is a flow diagram illustrating an example process for implementing the operations of module 102*b*. The process is, optionally, governed by instructions that are stored in a computer memory or non-transitory computer readable storage medium and that are executed by one or more processors of a server system (e.g., system 100). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations may be combined and/or the order of some operations may be changed.

In operation 201, a customer service representative searches for a member using the member's HCID via Search app. In some implementations, all members in the family policy have the same HCID.

In operation 202, the Search app finds the member information and displays the list of all members in the family along with their registration status individually. Data parameters at the family level may also be displayed.

In operation 203, the customer service representative can initiate a data comparison activity (e.g., by clicking a Diagnosis affordance on a user interface of a computing device of system 100). This starts comparing the key parameters (e.g., identification data) at HCID level between source of truth and sources of references and displays visual results showing the data parameters (e.g., identification data) that matched and the ones that did not match.

In operation 204, if one or more data parameters results in a mismatch, diagnosis results show the mismatch clearly. In that case, a Fix affordance on the user interface of the computing device of system 100 may be presented to the customer service representative.

In operation 204*a*, if there are no errors, the customer service representative may notify the member and proceed with more questions.

In operation 204*b*, if there is an error, the customer service representative may select the Fix affordance, which causes the HCID details to be queued up in system 100 within Help database. In some implementations, data refresh may be scheduled in an overnight batch cycle.

In operation 205, data refresh activity uses RPA bots to extract data from source of truth and initiates a refresh in sources of references. This may happen on a daily basis on all data that was queued up throughout the day. After the data refresh, the system of reference has updated data which restores the member's broken experience via digital channels.

In some implementations, one or more of the operations described above may be performed at a server system including one or more processors. For example, a method may include (from the perspective of the server system): receiving a search query for data associated with a user (e.g., a user who has called in for assistance in accessing a digital service provided by the service provider system); obtaining first attribute data of the user from a first database in accordance with the search query (e.g., a sequence number of the user, stored in a first party database); obtaining second attribute data of the user from a second database in accordance with the search query (e.g., another instance of the sequence number of the user, provided by a third party vendor).

The method may further include: comparing the first attribute data to the second attribute data (e.g., to detect mismatches); determining, based on the comparing, that the first attribute data does not match the second attribute data (e.g., due to the sequence numbers not matching); verifying that the first attribute data and the second attribute data are both associated with the user (e.g., by comparing additional identification data stored at the first party and third party sources, such as HCID and first/last name); providing, on a user interface of a computing device of the server system, an option to update the second attribute data (e.g., a Fix affordance for the customer service representative to select); receiving selection of the option on the user interface to update the second attribute data; and upon receiving selection of the option to update the second attribute data, transmitting a request to update the second attribute data in the second database to match the first attribute data.

In some implementations, the data associated with the user is a name of the user; the first attribute data includes a first combination of first, middle, and/or last name of the user; and the second attribute data includes a second combination of first, middle, and/or last name of the user different from the first combination.

In some implementations, the data associated with the user is a date of birth of the user; the first attribute data includes a first birth year of the user; and the second attribute data includes a second birth year of the user different from the first birth year of the user.

In some implementations, the data associated with the user is a sequence number of the user; the first attribute data includes a first sequence number of the user; and the second attribute data includes a second sequence number of the user different from the first sequence number of the user.

In some implementations, obtaining the first attribute data includes accessing a first party computing device of the server system; and obtaining the second attribute data includes accessing a third party computing device not included in the server system.

In some implementations, obtaining the first attribute data includes accessing a computing device having a first threshold level of trust; and obtaining the second attribute data includes accessing a computing device having a second threshold level of trust lower than the first threshold level of trust.

In some implementations, obtaining the first attribute data includes accessing a source of truth computing device; and obtaining the second attribute data includes accessing a source of reference computing device.

In some implementations, verifying that the first attribute data and the second attribute data are both associated with the user includes: comparing third attribute data of the user obtained from the first database with fourth attribute data of the user obtained from the second database; and determining, based on the comparing, that the third attribute data matches the fourth attribute data.

In some implementations, the third and fourth attribute data include a last name of the user, a date of birth of the user, a healthcare identifier of the user, an email address of the user, or an activation code associated with the user.

In some implementations, the option to update the second attribute data is a graphical affordance on a display of the computing device.

In some implementations, transmitting the request to update the second attribute data includes initiating a robotic process automation (RPA) bot configured to make requests to third party computing devices to update data stored therein.

Module 102c implements Invite to Register features in accordance with some implementations. In some implementations, the invite to register feature identifies members in a family who are eligible to register with the service provider system, but are not registered yet, and acts as a gateway to invite such members (e.g., via email) prompting them to register (e.g., on web or mobile). If members follow a customized link in the email, they merely need to enter, for example, their first name, last name, and date of birth to identify themselves because the eligibility check and HCID parameters would have already been baked in the customized link (also referred to as a personalized deep link) sent via email.

In some implementations, module 102c initial requires key parameters from the member (HCID, first/last name, DOB), and generates a registration link to obtain additional data from the member. In some implementations, the key parameters may be obtained from a phone call. Module 102c checks whether the member is eligible to register or not (e.g., by checking a group level block and/or a contract level block).

The customer service representative may select an affordance on a user interface of a computing device of system 100 causing the customized link to be sent to the member's email address. The member may click the link and fill in the rest of the data. The member does not have to enter the initially obtained key parameters (e.g., does not have to enter the HCID, first/last name, DOB). In some implementations, such data is pre-populated. Alternatively, such data may not even be included in the member-facing interface. Whether pre-populated or not included, such functionality increases member satisfaction by not requiring the member to enter the same information multiple times.

In an example scenario, the member contacts (e.g., calls) a customer service representative, and the customer service representative initiates a process to check whether the member is registered. If registered, then the customer service representative may proceed accordingly to answer the member's questions. If not registered, then the customer service representative may use module 102c to check if the member is eligible for registration.

In some implementations, eligible members may not be registered because of privacy settings specific to the member or because of a block set by the group policy holder (e.g., company or primary insurance holder) due to a discrepancy, issue, or error (e.g., wrong benefits information entered into the healthcare system) in the group policy insurance for the member.

If the member is eligible for registration, module 102c may proceed to generate an email with a personalized deep link configured to link the member to a web page implementing an application configured to obtain additional identification information of the member in order to complete the user's registration process.

In some implementations, one or more of the operations described above may be performed at a server system including one or more processors. For example, a method may include (from the perspective of the server system): receiving first identification data associated with a member of a service provider system implemented at least in part by the server system; determining that the member is not registered with the service provider system; and determining that the member is eligible for registration with the service provider system based on the first identification data.

The method may further include transmitting an electronic communication to the member including a customized link to an application configured to obtain second identification data of the member, wherein the second identification data does not include the first identification data; receiving, via the application, the second identification data of the member; associating the second identification data with the first identification data; and registering the member with the service provider system using the first identification data and the second identification data.

In some implementations, the service provider system is a healthcare provider system.

In some implementations, the first identification data includes a healthcare identifier of the member, a name of the member, and/or a date of birth of the member; and the first identification data includes attribute data of the member not including any of the first identification data.

In some implementations, determining that the member is eligible for registration includes verifying that at least a portion of the first identification data is present in a membership database.

In some implementations, determining that the member is eligible for registration includes determining that at least a portion of the first identification data is associated with identification data of a second member who is registered with the service provider system.

In some implementations, the application is configured to obtain the second identification data and forgo obtaining the first identification data.

In some implementations, the application is configured to pre-populate one or more fields including at least a portion of the first identification data, and provide one or more fields configured to obtain the second identification data.

In some implementations, the application is configured to forgo displaying at least a portion of the first identification data, and provide one or more fields configured to obtain the second identification data.

In some implementations, associating the second identification data with the first identification data includes storing the second identification data in one or more database fields corresponding to the member.

In some implementations, registering the member with the service provider system includes classifying the member in a database of the service provider system as registered, and storing the first identification data and the second identification data in one or more fields of the database corresponding to the member.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims.

For example, specific features of the exemplary embodiments may or may not be part of the claimed invention, different components as opposed to those specifically mentioned may perform at least some of the features described herein, and features of the disclosed embodiments may be combined.

As used herein, the terms "about" and "approximately" may refer to + or −10% of the value referenced. For example, "about 9" is understood to encompass 8.2 and 9.9.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

It will be understood that, although the terms "first," "second," etc. are sometimes used herein to describe various elements, these elements should not be limited by these terms. These terms are only used to distinguish one element from another.

For example, a first element could be termed a second element, and, similarly, a second element could be termed a first element, without changing the meaning of the description, so long as all occurrences of the "first element" are renamed consistently and all occurrences of the second element are renamed consistently. The first element and the second element are both elements, but they are not the same element.

As used herein, the term "if" may be, optionally, construed to mean "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The terminology used herein is for the purpose of describing particular implementations only and is not intended to be limiting of the claims.

As used in the description of the implementations and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items.

It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

As used herein, the term "if" may be construed to mean "when" or "upon" or "in response to determining" or "in accordance with a determination" or "in response to detecting," that a stated condition precedent is true, depending on the context.

Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A method for managing confidential communications in a service provider system, comprising:

at a server system including one or more processors:

receiving a search query for a user's information;

retrieving, from a database, user information including a confidentiality status;

generating a search result interface that visually distinguishes the user's information based on the confidentiality status;

displaying the search result interface, including an indication that confidential communication is invoked for the user;

storing a confidential communication password and an alternate address associated with the user;

receiving a request from an agent to access the user's confidential information; and initiating a privacy validation process, wherein the privacy validation process is an automated HIPAA validation process, the privacy validation process including:

prompting the agent to perform a verbal privacy validation with the user;

verifying completion of required privacy validation steps; and upon successful completion of the privacy validation process:

providing the agent with secure access to the confidential communication password; and logging the password access event in an audit trail, wherein the system utilizes natural language processing for interactions within the service provider system.

2. The method of claim 1, further comprising:

identifying one or more users associated with the user who are eligible to register with the service provider system but are not registered; and generating a personalized registration link for each of the identified users, wherein the personalized registration link is configured to prompt the respective user to register on a web or mobile platform.

3. The method of claim 2, wherein the personalized registration link, when accessed by a user, presents a user interface requiring the user to enter only a first name, last name, and date of birth for identification.

4. The method of claim 1, further comprising:

comparing data between a primary data source and one or more secondary data sources;

detecting one or more mismatches between the data from the primary data source and the one or more secondary data sources; and initiating a data refresh process to update the one or more secondary data sources based on the data from the primary data source.

5. The method of claim 4, wherein the data refresh process utilizes Robotic Process Automation (RPA) to extract data from the primary data source and update the one or more secondary data sources.

6. The method of claim 4, further comprising:

queuing the detected mismatches in a help database;

scheduling data refresh operations in an overnight batch cycle; and validating resolution of the reported issues by comparing current user experience against recorded diagnosis information.

7. The method of claim 1, further comprising:

monitoring alerts from a plurality of servers and platforms associated with the service provider system;

monitoring data transfer jobs that initiate Extract, Transform, Load (ETL) processes to move data from a primary data source to one or more secondary data sources; and providing, through a user interface of the server system, access to information about the monitored alerts and data transfer jobs.

8. The method of claim 1, wherein analyzing the verbal privacy validation comprises using the natural language processing to verify completion of required HIPAA validation steps.

9. The method of claim 8, further comprising:

upon successful completion of the automated HIPAA validation process:

generating a password for the user's portal login; and providing the agent with access to the temporary password through a secure channel; and logging the password provision event in the audit trail.

10. The method of claim 1, further comprising:

displaying a heat map visualization showing login trends over a time period; and overlaying login concentration indicators on a geographic map based on IP addresses captured during user logins.

11. The method of claim 1, further comprising:

providing role-based access control for the service provider system;

authenticating associates using their network credentials based on the role-based access control; and auditing transactions performed within the system.

12. The method of claim 1, wherein retrieving the user information comprises:

searching for the user using different input combinations including a member identifier, first name, last name, date of birth, username, email address, and activation code.

13. The method of claim 1, further comprising:

monitoring a chatbot interface to receive portal validation requests;

in response to receiving the portal validation requests:

initiating automated validation activities, capturing screenshots of portal user interface components, and triggering emails containing validation details to requestors.

14. The method of claim 1, further comprising:

receiving, via a chatbot interface, a portal health check request;

automatically initiating validation processes using robotic process automation bots;

performing portal validation using an integrated RASA framework and artificial intelligence/machine learning models; and providing portal health check and validation status results in response to a single message query.

15. The method of claim 1, further comprising:

displaying activity-based member engagement rewards at group and individual member levels; and presenting the rewards in either dollar amounts or points format based on applicable reward types.

16. The method of claim 1, wherein the service provider system is a healthcare provider system, and the method further comprises:

providing a concierge service interface for managing unfulfilled healthcare provider appointments; and displaying appointment information at both member and provider levels for appointments scheduled online.

17. The method of claim 1, further comprising:

managing identification card data movement between the service provider system and print vendors;

monitoring identification card trends and email campaign statistics based on tracking status and progress of daily processed files; and providing access to identification card images based on the monitored identification card trends and email campaign statistics.

18. The method of claim 1, wherein verifying completion of required privacy validation steps comprises:

analyzing audio of the verbal privacy validation using the natural language processing; and performing validation against HIPAA privacy rules when confidential communication is invoked for the user.

19. The method of claim 1, further comprising:

providing an insights interface that displays: (i) registration trends over time; (ii) login statistics across web and mobile platforms; (iii) self-service capability metrics; and (iv) group-level registration and login trend reports for marketing teams and account executives.

20. A method for managing confidential communications in a service provider system, comprising:

at a server system including one or more processors:

receiving a search query for a user's information;

retrieving, from a database, user information including a confidentiality status;

generating a search result interface that visually distinguishes the user's information based on the confidentiality status;

displaying the search result interface, including an indication that confidential communication is invoked for the user;

storing a confidential communication password and an alternate address associated with the user;

receiving a request from an agent to access the user's confidential information; and initiating a privacy validation process, wherein the privacy validation process is an automated validation process based on privacy rules, the privacy validation process including:

prompting the agent to perform a verbal privacy validation with the user;

verifying completion of required privacy validation steps; and upon successful completion of the privacy validation process:

providing the agent with secure access to the confidential communication password; and logging the password access event in an audit trail, wherein the system utilizes natural language processing for interactions within the service provider system.

* * * * *